US008805564B2

(12) United States Patent
Fontanot et al.

(10) Patent No.: US 8,805,564 B2
(45) Date of Patent: Aug. 12, 2014

(54) METHOD AND SOFTWARE FOR CONTROLLING JUST IN TIME ITEM PRODUCTION VIA KANBAN CARDS

(75) Inventors: Paolo Fontanot, Monfalcone (IT); Antje Haase, Genoa (IT); Fabio Sala, Fenegro (IT)

(73) Assignee: Siemens Aktiengesellschaft, Munich (DE)

( * ) Notice: Subject to any disclaimer, the term of this patent is extended or adjusted under 35 U.S.C. 154(b) by 398 days.

(21) Appl. No.: 13/337,644

(22) Filed: Dec. 27, 2011

(65) Prior Publication Data

US 2012/0165968 A1   Jun. 28, 2012

(30) Foreign Application Priority Data

Dec. 27, 2010   (EP) ..................................... 10197022

(51) Int. Cl.
*G06F 17/00* (2006.01)
(52) U.S. Cl.
USPC .............................. 700/101; 700/99; 700/103
(58) Field of Classification Search
USPC ................ 700/95, 97, 99, 100, 101, 103, 106
See application file for complete search history.

(56) References Cited

U.S. PATENT DOCUMENTS

| 6,970,756 | B2 | 11/2005 | Levionnois |
| 7,257,454 | B2 * | 8/2007 | Chien ............................ 700/101 |
| 2003/0018504 | A1 * | 1/2003 | Yamada et al. .................... 705/7 |
| 2009/0105866 | A1 * | 4/2009 | Fontanot ........................ 700/112 |
| 2010/0082138 | A1 * | 4/2010 | Hayes et al. ..................... 700/99 |
| 2010/0083160 | A1 | 4/2010 | Hayes et al. |
| 2012/0136758 | A1 * | 5/2012 | Parente et al. .................. 705/28 |

FOREIGN PATENT DOCUMENTS

WO   03019435 A1   3/2003

OTHER PUBLICATIONS

Schönsleben et al, "Techniques for Planning and Control Dependent on Different Types of Flexibility", Annals of the CIRP vol. 56, No. 1, Jan. 2007, pp. 451-154, XP027151099.
Yoonho Seo et al., "Configuration and operation of a pull-type flexible manufacturing system", Manufacturing Review, vol. 4, No. 1, Mar. 1991, pp. 44-52, XP0002024977.
Tachizawa et al., "Supply flexibility strategies in Spanish firms: Results from a survey", International Journal of Production Economics, Elsevier, Amsterdam, NL, vol. 124, No. 1, Mar. 1, 2010, pp. 214-224, XP026863779.

* cited by examiner

*Primary Examiner* — Charles Kasenge
(74) *Attorney, Agent, or Firm* — Laurence A. Greenberg; Werner H. Stemer; Ralph E. Locher (57) ABSTRACT

A method and a system control just in time item production via kanban cards. The items are transformed according to a flow shop containing a raw material buffer followed by a sequence of production pairs containing one workstation and an assigned buffer. A local buffer threshold parameter is provided and denotes the desired safety stock of the items of the specific type in the buffer. A global demand threshold parameter is provided and denotes the quantity of items of the specific item type required along the downstream process to satisfy the estimated demand. Whenever a kanban card is associated to an item of a specific type switches status, it is assigned one of four priority levels indicating the priority level of the production request. At each production pair, an item is produced of a type whose priority level is the highest according to a given priority model.

10 Claims, 2 Drawing Sheets

METHOD AND SOFTWARE FOR CONTROLLING JUST IN TIME ITEM PRODUCTION VIA KANBAN CARDS

CROSS-REFERENCE TO RELATED APPLICATION

This application claims the priority, under 35 U.S.C. §119, of European application EP 10197022, filed Dec. 27, 2010; the prior application is herewith incorporated by reference in its entirety.

BACKGROUND OF THE INVENTION

Field of the Invention

The present invention relates to a method and to a system for controlling just in time production via kanban cards.

In the manufacturing field, with the term "flow shop" it is indicated a discrete manufacturing production system where items are transformed and assembled according to well defined routes that follow the process layout.

In the flow shop, it is possible to identify one or more sequences of production stages where the items are manufactured. Such production stages are also denoted also as workstations. Moreover, at the flow shop, the process consists of a series of production steps and the operations of every productive job are processed on machines and workstations in the same order. In few words, in the shop flow, the work shall follow a fixed path.

Typically, in the flow shop, between the different workstations there is a buffer for work in process inventories in order to decouple the process of each workstation and to safeguard against random fluctuations of the production pace as well as of the demand for items.

In several cases, the production flow in the flow shop can be controlled using Just-In-Time (JIT) methods like the "kanban" method, with the goal of synchronizing the production achieving at the same time the maximum service level, i.e. the capability to satisfy the product demand, and the lowest possible amount of waste due to inefficiencies and work in process inventories.

The kanban method consists in visual signals/tickets/cards, called "kanbans" or "kanban cards", that are used to authorize production activities without the need for releasing and dispatching production orders to the shop floor. Workstations are authorized to operate only when a production kanban card is received: a fixed amount of material (either a subassembly or a final product) is produced for each kanban card and eventually moved to the downstream stage when another movement kanban card is issued to authorize the movement.

Kanban cards tell the operators when to start and stop producing at a production stage and when to move the items from a production stage to the next one.

Figure 1:
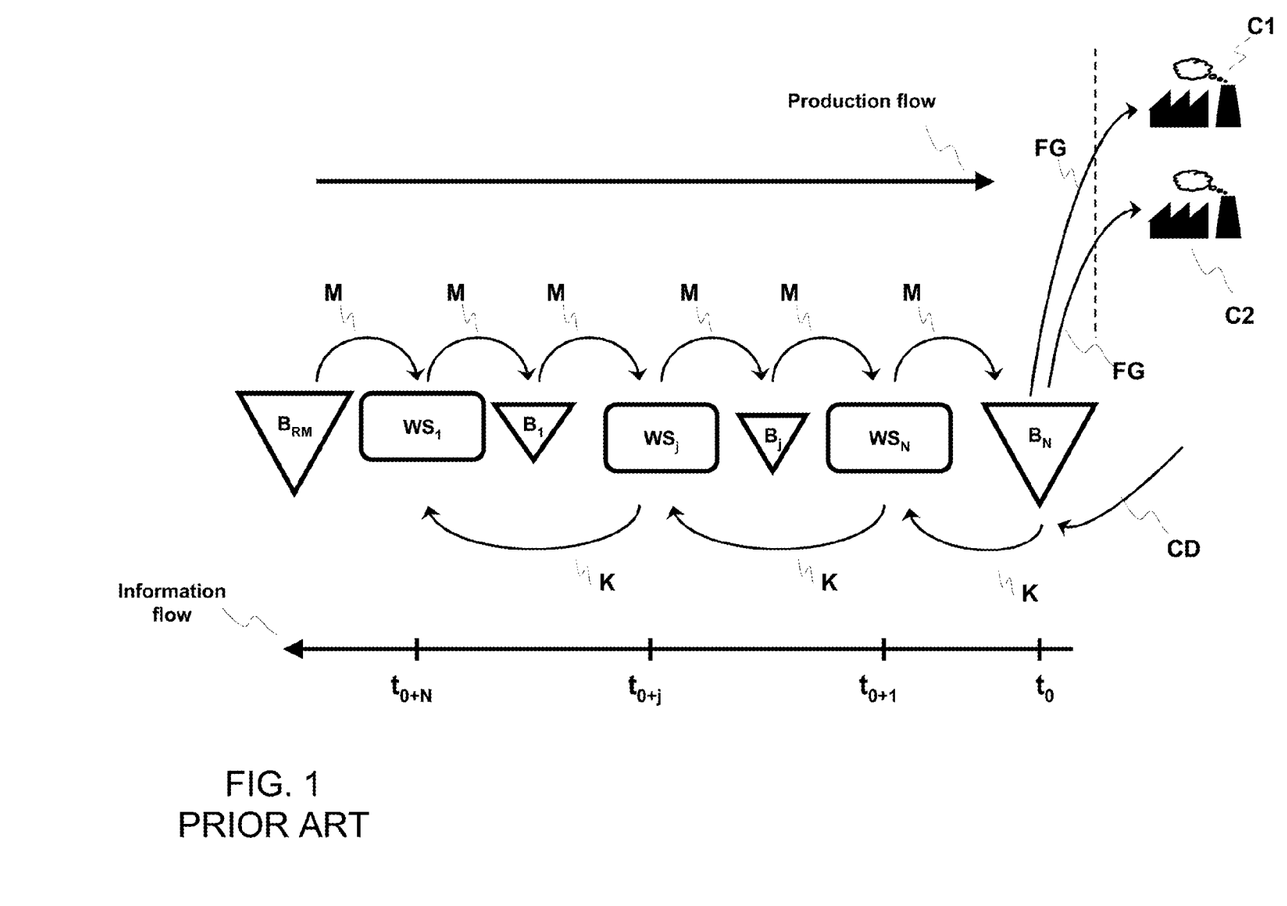
FIG. 1 is a diagram which schematically illustrates a flow shop using a Kanban method according to the prior art.

FIG. 1 is a diagram schematically illustrating a flow shop type of production system using a kanban method. In FIG. 1, the customer demand CD for production of some finished good material FG is originated by customers C1, C2. At the beginning of the production flow, a raw material buffer $B_{RM}$ contains raw material for the production of items for work in process material M. The production flow contains N production pairs, each containing a workstation $W_j$ and its assigned buffer $B_j$. The buffer $B_N$ of the last production pair contains the produced finished good items FG intended to be sent to the customers C1, C2. The first stage of the production flow is performed at the first workstation $WS_1$ and the last stage of the production flow is performed at the last workstation $WS_N$.

Between the first workstation WS1 and the last workstation $WS_N$ there are one or more intermediate workstations $WS_j$. Information on items to be produced is conveyed via kanban cards K between each workstation $W_1$. It is noted that the stream of information flow is the opposite than the stream of material production flow, i.e. downstream workstations with respect to one given workstation are located at its right while upstream workstations with respect of a given workstation are located at its left.

Kanban methods may use cards, boards, lights, empty containers or any other means to signal the need for an item. Each kanban card corresponds to a fixed amount (one or more) of items to be produced and moved at the same time. The mechanism of kanbans regulates the production flow between all the stages of the production process. The buffer stock level in every buffer between the different production stages is limited by the number of kanban cards available in the process.

For each specific item, the available quantity of material can be roughly measured on the basis of the number of "full" kanban cards for that item, i.e. the number of kanban cards between two production stages assigned to a particular item or part number that are in the "full" status.

In fact, kanban cards are typically assigned with one of the following two statuses: an "empty status": when the material piece is used by the downstream stage, the kanban status is updated so that a signal is sent to the previous stage for material replenishment; and "full status": when the material piece is produced, the kanban status is updated and the container (material and kanban card) is moved to the buffer (available for the downstream stage).

Advantageously, by limiting the number of kanban cards also the waste due to inventory is limited.

Kanban methods have optimum performances in scenarios in which the demand is relatively constant.

Unfortunately, in some other scenarios, kanban methods may present some drawbacks.

Examples of problematic scenarios are flow shops in which multiple items are produced at the same time, where at some stages of the production process, it is possible that more than one kanban card per item arrive simultaneously, requiring the production of different items of different type at the same time.

However, since, usually, in a workstation only one item at a time can be manufactured, the workstation operator has to select which is the kanban card of a specific item type to be processed first. This operator's choice may be free or, most probably, follows one of the pre-defined methods of the specific company, e.g. First-In-First-Out (FIFO).

It is evident how this choice may have problematic impacts. In fact, this choice is performed by each operator at a local level, i.e. at the level of the workstations, but this choice affects the overall performances of the whole production process. In fact, the workstation operators, who are involved in a kanban production flow, have typically no possibility to foresee a variation in demand by the end-customer because their visibility is limited to the incoming kanban cards at their own workstation. These kanban cards only tell the operator to produce new items to replace the ones consumed by the immediately next production step or by the end customer.

In case different kanban cards for different item types arrive to a workstation from more than one consuming resource, the operators are typically not prepared to react correctly so as to minimize the drawbacks caused by wastes from overproduction or by the delays from underproduction.

Moreover, real world operational conditions amplify these problems because the theoretical hypotheses for using kanban, i.e. relatively constant demand, are often not met. In general, kanban methods have best performances with a relatively smooth rate of the demand, a "constant" production lead time, a short set up time and repetition of demand. In reality, the demand rate is rarely constant and, instead, low and unpredictable fluctuations on demand have to be managed. Sometimes there are bigger fluctuations due to the request for new items not already present in the production flow (phase-in of new products) or due to stopping producing some other items (phase-our of a product).

Increases or decreases of the demand, even if they are little, have an impact on the production flow and on the material supply. If some process varies its withdrawal of items, the range of these fluctuations will increase as they move up the line towards the earlier processes. This is known as demand amplification. The variation of product demand acts like a wave through the entire production process and impacts at staggered time all production steps. For example, this means that, when all work stations are busy producing some item, the effect of a demand fluctuation at the last workstation $WS_N$ propagates slowly to the upstream work stations and reaches the first workstation $WS_1$ after N times the average throughput time of a work station. The effect of this slow propagation of the demand "wave" is a global delay of the productive system in responding to fluctuations of the demand for finished product FG.

To better understand this concept, let us consider the following limit situation: when an item of a specific type is not required anymore, the operator at the workstation does not detect this change immediately and may continue to produce the material M that is not required anymore because he/she still have some empty kanban cards to be fulfilled. With production terminology, one can say that the workstation operator may be producing waste when the demand decrease and he/she may be producing in delay when the demand rises.

Prioritization of different kanban cards requiring different item types to be produced has been explored and utilized in different situations. The downstream adjacent workstation which generates an empty kanban card can notify the urgency of the underlying message by using for example different colors for the issued kanban card, like for example with the Red-Amber-Green (RAG) method applied to individual kanban cards.

According to the RAG kanban method, it is possible using a traffic light RAG system to prioritize the work of the supplying workstation, since it may receive replenishment signals from more than one consuming resource simultaneously. The traffic light color-coding system is using three colors: Red means needs "urgent action" (out of control, shortage imminent), Amber means "going out of control" (on the borderline, needs reordering) and Green means "no problem" (within acceptable limits).

In the following example, the RAG method applied to individual kanban cards is illustrated. Let us assume we have a molding shop at a motorbike manufacturer supplying eleven different assembly lines with a variety of components. Let us assume that there are constant assembly shortages in some assembly lines while other assembly workstations are climbing over moldings. In order to improve such problematic situation, the total kanban population for each item may be equally divided into three color-coded RAG groups. For example, green kanbans are to be used first until they are exhausted, followed by amber kanbans and then red kanbans. Advantageously, by using this RAG kanban method, the work-in-process control problems may disappear since the system operates very happily with green and amber kanbans setting priorities. Instead, the appearance of a red kanban in the molding shop causes significant attention to be paid to it.

The RAG kanban method applied to individual kanban cards has the advantage of simplicity but the disadvantage of being not much flexible.

In fact, with this method, once a kanban card has been issued with a given priority, this priority remains unchanged even if there is a change on the demand for products.

In their most simple and traditional forms, kanban methods rely only on the exchange of visual signals like cards or empty containers.

Known improvements of traditional kanban methods are Electronic Kanban (eKanban) techniques which provide with more flexibility in improving the Kanban process flow. The Kanban systems contains all the basic components of traditional Kanban systems whilst using IT systems also in order to replace traditional kanban cards with barcodes and electronic messages. The eKanban system is a signaling system that can use a mixture of different technologies to automatically trigger in real time material movement and/or production activities at the workstations. The data transfer can be done either manually by an operator entering the data or automatically via a barcode reader, RFID chips or other methods so as to reduce information delivery time. Kanban cards can be replaced in eKanban by "virtual Kanban cards" displayed on a computer screen on a virtual Kanban board. The eKanban signal notifies the need of restocking of items when a predefined minimum of stock level is reached at each local buffer.

The RAG kanban and eKanban systems solve the problem of dealing with simultaneous requests but not the problem of containing the impact of demand propagation fluctuations.

SUMMARY OF THE INVENTION

It is accordingly an object of the invention to provide a method for controlling JIT item production via kanban cards which overcome the above-mentioned disadvantages of the prior art methods of this general type, which minimizes the impact of demand propagation fluctuations.

The aforementioned aim is achieved by a method and a system for controlling JIT item production via kanban cards in a discrete manufacturing production system. Items are transformed according to a flow shop containing a raw material buffer followed by a sequence of production pairs containing one workstation and its assigned buffer. Each workstation produces an item to be moved into its assigned buffer. The first workstation produces an item starting from the raw material buffer and each other remaining workstation produces an item starting from the buffer assigned to the previous adjacent workstation. Each workstation is able to produce more than one type of item according to requests received by different sets of different kanban cards associated to different item types. Each set of kanban cards consists of a given number of kanban cards. Each kanban card can have two statuses including an empty status denoting that item replenishment is requested and a full status denoting that the produced item is ready in the buffer. For each production pair, for each specific item type and at given points in time, a local buffer threshold parameter is provided and denotes the desired safety stock of the items of the specific type in the buffer. For each production pair, for each specific item type and at other given points in time, a global demand threshold parameter is provided and denotes the quantity of items of the specific item type required along the downstream process to satisfy the estimated demand. At each production pair, whenever a kanban card associated to an item of a specific type switches status, it is assigned to it one of four priority levels indicating the priority level of the production request of the associated item type, according to the following logical rules: a first priority level is assigned to the kanban card if the number of full kanban cards of items of the same specific type at the production pair buffer is greater than the local buffer threshold and if the number of full kanban cards for the items of the same specific type along the downstream process is greater than the global demand threshold; a second priority level is assigned to the kanban card if the number of full kanban cards of items of the same specific type at the production pair is lower or equal than the local buffer threshold and if the number of full kanban cards for the items of the same specific type in the downstream process is greater than the global demand threshold; a third priority level is assigned to the kanban card if the number of full kanban cards of items of the same specific type at the production pair is greater than the local buffer threshold and if the number of full kanban cards for the items of the same specific type along the downstream process is lower or equal than the global demand threshold; a fourth priority level is assigned to the kanban card if the number of full kanban cards of items of the same specific type at the production pair is lower or equal than the buffer threshold and if the number of full kanban cards for the items of the same specific type along the downstream process is lower or equal than the demand threshold. At each production pair, producing an item of a type whose priority level is the highest according to a given priority model defining the priority sequence of the four priority levels for the production requests for different item types.

In the invention embodiment, wherein the sentence states "whenever a kanban card associated to an item of a specific type switches status" it may preferably be meant: "whenever a kanban card associated to an item of a specific type switches status from empty to full or from full to empty" or "whenever a kanban card associated to an item of a specific type switches status from empty to full or whenever a kanban associated to an item of a specific type switches status from full to empty".

In inventive embodiments, referring as production pair "j" the generic production pair of the "N" production pairs where "j" is comprised between "1" and "N"; and wherein at step b) the global demand threshold parameter for production pair "j" may preferably be calculated as the number of finished good items of the specific type, required in the average lead time interval, defined as the average time for an item of a certain type to move from buffer "j−1" to buffer "N" of the production flow; and wherein the number of full kanban cards for the items of the same specific type along the downstream process may be calculated as the sum of the full kanban cards contained in each of the buffer belonging to each production pair comprised between production pair "j−1" and production pair "N".

According to an embodiment of the invention, the kanban cards may be conveniently assigned to different priority levels are marked with different colors.

According to an embodiment of the invention, the kanban card may advantageously be marked with colors as follows: a kanban card of the first priority level is assigned with a green color; a kanban card of the second priority level is assigned with a blue color; a kanban card of the third priority level is assigned with a yellow color; and a kanban card of the forth priority level is assigned with a red color.

According to another embodiment of the invention, information on kanban cards may conveniently be visualized on a screen via an electronic kanban-board at the workstation via a Manufacturing Execution System which is provided with the real time information on the movements of produced items and of the kanban cards.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

The proposed invention enables to timely react to changes in the customer demand for finished goods. Thus, the invention embodiments minimize the negative impacts of fluctuations in the finished good demand which may produce slow wave propagation through the production stages.

According to a further embodiment of the invention, the prioritization of production of items of different types is signaled via a priority model which may provide visual and/or intuitive instructions to workstation operator.

Embodiments of the proposed invention are compatible with the JIT philosophy and enhance the JIT capabilities of a production flow.

Other features which are considered as characteristic for the invention are set forth in the appended claims.

Although the invention is illustrated and described herein as embodied in a method for controlling JIT item production via kanban cards, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the drawings, like reference signs refer to same or similar elements.

According to the proposed invention, the item manufacturing path is organized in a flow shop with JIT control and kanban cards.

Figure 2:
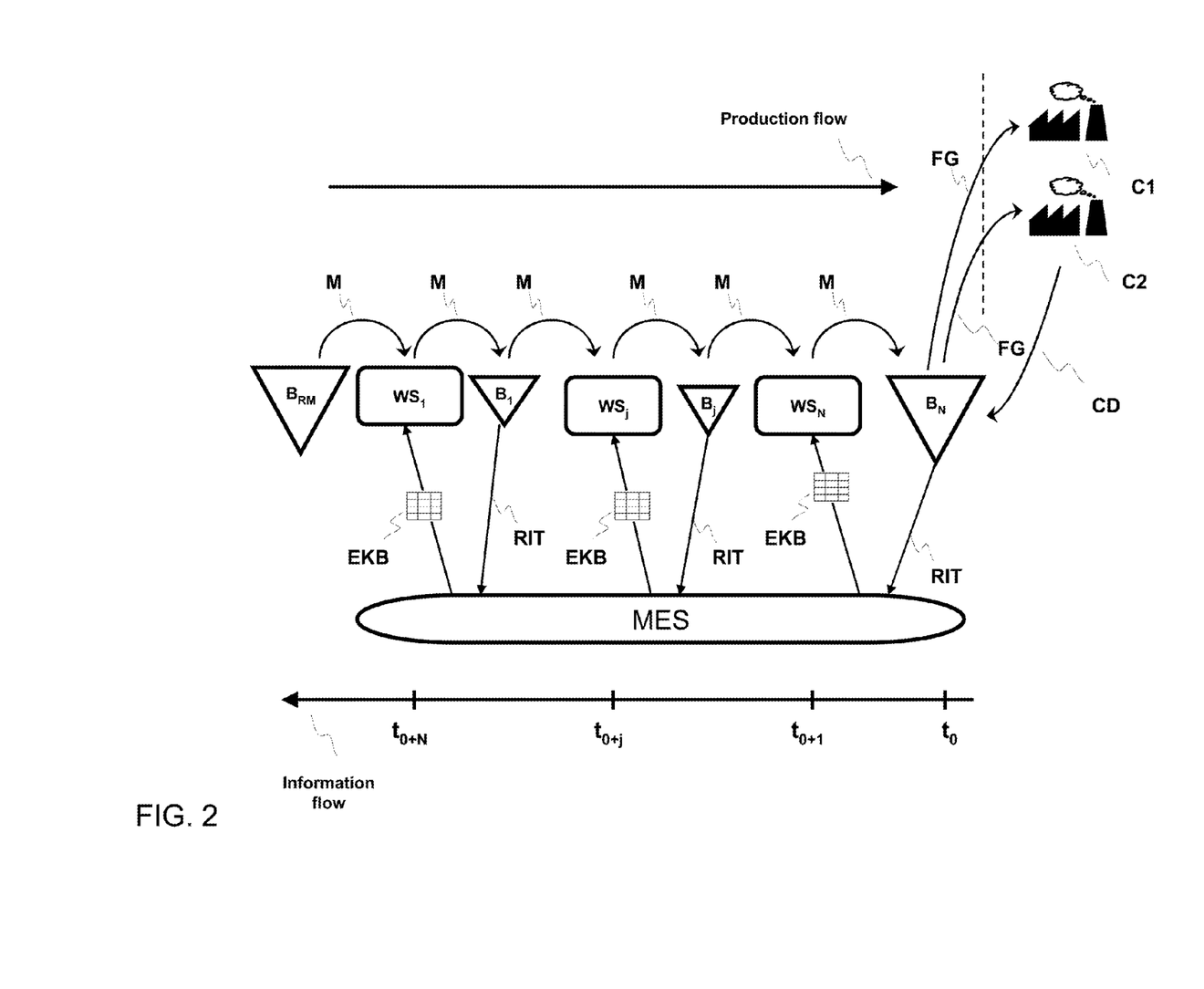
FIG. 2 is a diagram which schematically illustrates a flow shop in accordance with an example embodiment according to the present invention.

Referring now to the figures of the drawing in detail and first, particularly, to FIG. 2 thereof, there is shown a diagram schematically illustrating a production flow in accordance with an example embodiment of the present invention.

As shown in FIG. 2, items M are transformed according to a production flow containing a raw material buffer $B_{RM}$ followed by a sequence of production pairs $W_1,B_1$; $W_j,B_j$; $W_N,B_N$ containing one workstation $W_j$ and its assigned buffer $B_j$. Each workstation $W_j$ produces, by consuming items M containing in the adjacent previous buffer $B_{j-1}$, an item M to be moved into its assigned buffer $B_j$. The first workstation $W_1$ produces an item M starting from items contained in the raw material buffer $B_{RM}$ and each other remaining workstation produces an item starting from items contained in the buffer assigned to the previous adjacent workstation. According to the present invention, each workstation $W_j$ is able to produce more than one type of items according to requests received by different sets of different kanbans cards EKB associated to different item types. In the embodiments of FIG. 2, it is present a MES system receiving real time information RIT from each buffer $B_j$ and signaling production requests to each workstation $W_j$ by electronic kanban cards EKB. The skilled in the art easily understands that electronic kanban cards may be physical or virtual cards.

For each type of item to be produced are provided a set of kanban cards consisting of a given number of cards. Each kanban card can have two statuses: 1) an empty vstatus denoting that item replenishment is requested (since the item is being used by the following adjacent workstation) and 2) a full status denoting that the produced item is ready in the buffer.

For each production pair $W_1,B_1$; $W_j,B_j$; $W_N,B_N$, for each specific item type and at given points in time, a local buffer threshold parameter is provided for denoting what is the wished safety stock of the items of the specific type in the buffer of the production pair.

For each production pair $W_1,B_1$; $W_j,B_j$; $W_N,B_N$, for each specific item type and at other given points in time, a global demand threshold parameter is provided for denoting the quantity of items of the specific item type required along the downstream process to satisfy the estimated demand.

The value of the local and global threshold parameters are calculated at some given points in time which may be the same or may differ for the local and global thresholds.

The given points in time may be periodically set or may be triggered by some events as, for example, the change of any of the variables at stake, e.g. every time an item of the specific type is produced and/or every time an item of the specific type is consumed.

At each production pair $W_1,B_1$; $W_j,B_j$; $W_N,B_N$, whenever a kanban card associated to an item of a specific type switches status from full to empty or from empty to full (alternatively or in both situations), the kanban card is assigned to one of four priority levels indicating the priority level of the production request of the associated item type.

The priority level is assigned according to the following logical rules:
a first priority level is assigned to the kanban card if the number of full kanban cards of items of the same specific type at the production pair buffer is greater than the local buffer threshold and if the number of full kanban cards for the items of the same specific type along the downstream process is greater than the global demand threshold;
a second priority level is assigned to the kanban card if the number of full kanban cards of items of the same specific type at the production pair is lower or equal than the local buffer threshold and if the number of full kanbans for the items of the same specific type in the downstream process is greater than the global demand threshold;
a third priority level is assigned to the kanban card if the number of full kanban cards of items of the same specific type at the production pair is greater than the local buffer threshold and if the number of full kanbans for the items of the same specific type along the downstream process is lower or equal than the global demand threshold; and
a fourth priority level is assigned to the kanban card if the number of full kanban cards of items of the same specific type at the production pair is lower or equal than the buffer threshold and if the number of full kanbans for the items of the same specific type along the downstream process is lower or equal than the demand threshold.

At each production pair $W_1,B_1$; $W_j,B_j$; $W_N,B_N$, it is produced an item of a type whose priority level is the highest. The highest priority level is defined according to a given priority model. The priority model provides the sequence of priorities for each of the four priority levels in order to fulfill the production requests for different item types. Thus, at each production pair the operator produces the item of a type at highest priority level according to the defined priority model.

Advantageously, the four priority levels combine information about local status and global status of the production request for items of a given type at each production pair.

The local status provides an indication of the capability to satisfy the requirements of the adjacent following production stage.

Instead, the global status provides an indication of the capability to satisfy the customer demands for finished goods.

The local status is computed by comparing the buffer level, i.e. the amount of available items, at the given production stage pair, with a predefined local safety threshold representing a safety stock to compensate for local demand fluctuations. When the buffer level locally goes below such threshold, this item becomes urgent.

The global status is computed by comparing the buffer level at all other production stages with the estimated demand for these items. Such estimated demand is strictly related to the demand of finished products, calculated by exploding the bill of materials and taking in account the average throughput time of each production stage.

In embodiments of the present invention, the global demand threshold parameter for the workstation in generic position "j" (where "j" can assume values between "1" and "N", both extremes included) may be advantageously calculated as the number of finished good items FG demanded by the customer CD in the time interval between "current time" and "current time+Tj"; where Tj is the average lead time of a piece of a certain type to move from buffer $B_{j-1}$ to buffer $B_N$ (the last buffer in the production flow).

In embodiments of the present invention, the number of full kanban cards for the items of the same specific type along the downstream process may be calculated as the sum of the full kanban cards contained in each buffer belonging to each production pair contained between production pair "j-1" and production pair "N". Thus, the global demand is covered at the current production rate when the number of pieces (full kanban cards) contained in the buffers between j-1 an N is bigger then the global demand threshold parameter as defined above.

In embodiments of the present invention, different color signals may be assigned to the different kanban card priority levels as follows.

A kanban card assigned with the first priority level may be marked with a green color, indicating a "regular" status for the production of the specific item since both its local and its global statuses are not critical.

A kanban card assigned with the first priority level may be marked with a blue color, indicating a "sub-critical" status for the production of the specific item since its local status is critical but its global status is not critical.

A kanban card assigned with the first priority level may be marked with a yellow color, indicating a "expedite" status for the production of the specific item since its local status is not critical but its global status is critical.

A kanban card assigned with the first priority level may be marked with a green color, indicating a "critical" status for the production of the specific item since both its local and its global statuses are critical.

In this embodiment, a visual, color coded signal is advantageously used to give to the workstation operators an immediate indication of the priority of each specific item. In other embodiments, the light color may be also switched off, in a fifth priority level in case there is no request for that specific item.

In a preferred embodiment of the invention, information on the kanban cards and priorities may be visualized on a screen via an electronic kanban-board EKB at the workstation via a Manufacturing Execution System MES as shown in FIG. 2.

The electronic kanban board screens EKB may show, at each production stage/workstation, a color coded signal for each item to be produced, here denoted as part number, listing the electronic kanban cards sorted by item.

For example, the electronic kanban board EKB for the first workstation W1 may be represented by the following sample table, Table 1:

TABLE 1 sample table

| Part Number | Number of Kanban cards | Priority |
|---|---|---|
| xyz | 3 | Blue |
| xxx | 10 | Red |
| yyy | 0 | |
| zxy | 5 | Yellow |
| zzz | 6 | Green |

The logic of the MES system computes in real time, via real time information (RIT) provided manually or automatically via different means, the priority level/color for each kanban card of each part number.

In the sample embodiment shown in FIG. 2, a manufacturing execution system (MES) supervises the production flow with a full visibility on all items involved in the production process.

A logic implemented in the MES system computes the local and global statuses of material at each production stage, based on the available quantity on each buffer. Advantageously, these statuses are used to produce visual signals, e.g. colored lights, at each production stages that are based on the buffer level on the current production step while looking also at the downstream buffer levels to give indications to the workstation operators about the production priority for each specific item.

Conveniently, the negative impacts due to wave demand propagation are minimized. In fact, by supervising the entire production flow, the propagation of demand fluctuations through the production flow is anticipated since each production step is provided with information on what is happening on all the following production steps and not just on the adjacent one.

Workstation operators are thus provided with the visibility which enables them to timely react by making the right choices, especially in case of demand changes they are able react according to the disturbances in the flow control. Instead of reacting after receiving an incoming "wave" of demand fluctuation, it is possible to anticipate it by choosing the items to produce first. In the case of demand decrease for a specific item, workstation operators can quickly react by avoiding the waste related to the production of specific items not immediately requested. In the case of demand decrease for a specific item, workstation operators can quickly react by anticipating the production of some items, avoiding receiving requests that cannot be satisfied on time.

In other invention embodiments, at the intermediate storage point or at the buffer for the items just manufactured at each workstation, the place for each different specific item, i.e. part number, may be equipped with a physical light signal and a holder to keep the kanban cards for that part number. Moreover, kanban cards may contain an inexpensive RFID tag and the storage point may be equipped with an RFID antenna. With RFID tags, the MES may automatically be provided with the real time information RIT on the movements of produced items and of the kanban cards.

In addition to the embodiments of the present invention described above, the skilled persons in the art will be able to arrive at a variety of other arrangements and steps which, if not explicitly described in this document, nevertheless fall within the scope of the appended claims.

The invention claimed is:

1. A method for controlling a just-in-time (JIT) item production via kanban cards in a discrete manufacturing production system, items being transformed according to a flow shop containing a raw material buffer followed by a sequence of production pairs containing one workstation and an assigned buffer, each of the workstations producing an item to be moved into the assigned buffer, a first workstation producing the item starting from the raw material buffer and each other remaining workstation produces the item starting from the buffer assigned to a previous adjacent workstation, each of the workstations being able to produce more than one type of item according to requests received by means of different sets of different one of the kanban cards associated to different item types, each set of the kanban cards consists of a given number of kanbans, wherein each of the kanban cards can have two statuses including an empty status denoting that item replenishment is requested and a full status denoting that a produced item is ready in the assigned buffer, the method which comprises the steps of:

a) providing a local buffer threshold parameter denoting a desired safety stock of the items of a specific type in the assigned buffer for each of the production pairs, for each specific item type and at given points in time;

b) providing a global demand threshold parameter denoting a quantity of the items of the specific item type required along a downstream process to satisfy an estimated demand for each of the production pairs, for each of the specific item types and at other given points in time;

c) at each of the production pairs, whenever the kanban card associated to an item of the specific type switches status, assigning to the kanban card one of four priority levels indicating a priority level of a production request of the associated item type, according to the following logical rules:

assigning a first priority level to the kanban card if a number of full kanban cards of items of a same specific type at a production pair buffer is greater than the local buffer threshold parameter and if the number of full kanban cards for the items of the same specific type along the downstream process is greater than the global demand threshold parameter;

assigning a second priority level to the kanban card if the number of full kanban cards of items of the same specific type at the production pair is lower or equal than the local buffer threshold parameter and if the number of full kanban cards for the items of the same specific type in the downstream process is greater than the global demand threshold parameter;

assigning a third priority level to the kanban card if the number of full kanban cards of items of the same specific type at the production pair is greater than the local buffer threshold parameter and if the number of full kanban cards for the items of the same specific type along the downstream process is lower or equal than the global demand threshold parameter;

assigning a fourth priority level to the kanban card if the number of full kanban cards of items of the same specific type at the production pair is lower or equal than the local buffer threshold parameter and if the number of full kanban cards for the items of the same specific type along the downstream process is lower or equal than the global demand threshold parameter;

d) producing, at each of the production pairs, the item of a type whose priority level is highest according to a given priority model defining a priority sequence of the four priority levels for production requests for different item types.

2. The method according to claim 1, wherein at step c):

whenever the kanban card associated to the item of the specific type switches status it switches from one of empty to full or from full to empty; or whenever the kanban card associated to the item of the specific type switches status it switches from empty to full or whenever the kanban card associated to the item of the specific type switches status it switches from full to empty.

3. The method according to claim 1, wherein:

the production pairs include a production pair "j" being one of a generic production pair of "N" production pairs where "j" is comprised between "1" and "N"; and at step b) the global demand threshold parameter for the production pair "j" is calculated as a number of finished good items of the specific type, required in an average lead time interval, defined as an average time for an item of a certain type to move from the assigned buffer "j–1" to the assigned buffer "N" of a production flow; and the number of full kanban cards for the items of the same specific type along the downstream process is calculated as a sum of the full kanban cards contained in each of the assigned buffer belonging to each of the production pairs comprised between the production pair "j–1" and the production pair "N".

4. The method according to claim 1, wherein the kanban cards assigned to different priority levels are marked with different colors.

5. The method according to claim 4, wherein the kanban cards are marked with colors as follows:

the kanban card of the first priority level is assigned with a green color;

the kanban card of the second priority level is assigned with a blue color;

the kanban card of the third priority level is assigned with a yellow color; and the kanban card of the forth priority level is assigned with a red color.

6. The method according to claim 1, wherein information on the kanban cards are visualized on a screen via an electronic kanban-board (EKB) at a workstation via a manufacturing execution system (MES) which is provided with real time information (RIT) on movements of produced items and of the kanban cards.

7. The method according to claim 1, which further comprises providing the kanban cards with an RFID tag and equipping the assigned buffers with an RFID antenna.

8. A system, comprising:

production pairs each containing one workstation and an assigned buffer;

a raw material buffer;

means for controlling a just-in-time (JIT) item production via kanban cards in the system, items being transformed according to a flow shop containing said raw material buffer followed by a sequence of said production pairs, each of said workstations producing an item to be moved into said assigned buffer, a first workstation of said workstations producing the item starting from said raw material buffer and each other remaining said workstations produces the item starting from said assigned buffer assigned to a previous adjacent said workstation, each of said workstations being able to produce more than one type of item according to requests received by means of different sets of different one of the kanban cards associated to different item types, each set of the kanban cards consists of a given number of kanbans, wherein each of the kanban cards can have two statuses including an empty status denoting that item replenishment is requested and a full status denoting that a produced item is ready in the assigned buffer, said means programmed to:

a) provide a local buffer threshold parameter denoting a desired safety stock of the items of a specific type in said assigned buffer for each of said production pairs, for each specific item type and at given points in time;

b) provide a global demand threshold parameter denoting a quantity of the items of the specific item type required along a downstream process to satisfy an estimated demand for each of said production pairs, for each of the specific item types and at other given points in time;

c) at each of said production pairs, whenever the kanban card associated to an item of the specific type switches status, assign to the kanban card one of four priority levels indicating a priority level of a production request of the associated item type, according to the following logical rules:

assign a first priority level to the kanban card if a number of full kanban cards of items of a same specific type at said assigned buffer is greater than the local buffer threshold parameter and if the number of full kanban cards for the items of the same specific type along the downstream process is greater than the global demand threshold parameter;

assign a second priority level to the kanban card if the number of full kanban cards of items of the same specific type at said production pair is lower or equal than the local buffer threshold parameter and if the number of full kanban cards for the items of the same specific type in the downstream process is greater than the global demand threshold parameter;

assign a third priority level to the kanban card if the number of full kanban cards of items of the same specific type at said production pair is greater than the local buffer threshold parameter and if the number of full kanban cards for the items of the same specific type along the downstream process is lower or equal than the global demand threshold parameter;

assign a fourth priority level to the kanban card if the number of full kanban cards of items of the same specific type at said production pair is lower or equal than the local buffer threshold parameter and if the number of full kanban cards for the items of the same specific type along the downstream process is lower or equal than the global demand threshold parameter;

d) produce, at each of said production pairs, the item of a type whose priority level is highest according to a given priority model defining a priority sequence of the four priority levels for production requests for different item types.

9. A non-transitory computer-readable medium having computer-executable instructions executed on a processor for controlling a just-in-time (JIT) item production via kanban cards in a discrete manufacturing production system, items being transformed according to a flow shop containing a raw material buffer followed by a sequence of production pairs containing one workstation and an assigned buffer, each of the workstations producing an item to be moved into the assigned buffer, a first workstation producing the item starting from the raw material buffer and each other remaining workstation produces the item starting from the buffer assigned to a previous adjacent workstation, each of the workstations being able to produce more than one type of item according to requests received by means of different sets of different one of the kanban cards associated to different item types, each set of the kanban cards consists of a given number of kanbans, wherein each of the kanban cards can have two statuses including an empty status denoting that item replenishment is requested and a full status denoting that a produced item is ready in the assigned buffer, the instructions which comprises the steps of:
  a) providing a local buffer threshold parameter denoting a desired safety stock of the items of a specific type in the assigned buffer for each of the production pairs, for each specific item type and at given points in time;
  b) providing a global demand threshold parameter denoting a quantity of the items of the specific item type required along a downstream process to satisfy an estimated demand for each of the production pairs, for each of the specific item types and at other given points in time;
  c) at each of the production pairs, whenever the kanban card associated to an item of the specific type switches status, assigning to the kanban card one of four priority levels indicating a priority level of a production request of the associated item type, according to the following logical rules:
    assigning a first priority level to the kanban card if a number of full kanban cards of items of a same specific type at a production pair buffer is greater than the local buffer threshold parameter and if the number of full kanban cards for the items of the same specific type along the downstream process is greater than the global demand threshold parameter;
    assigning a second priority level to the kanban card if the number of full kanban cards of items of the same specific type at the production pair is lower or equal than the local buffer threshold parameter and if the number of full kanban cards for the items of the same specific type in the downstream process is greater than the global demand threshold parameter;
    assigning a third priority level to the kanban card if the number of full kanban cards of items of the same specific type at the production pair is greater than the local buffer threshold parameter and if the number of full kanban cards for the items of the same specific type along the downstream process is lower or equal than the global demand threshold parameter;
    assigning a fourth priority level to the kanban card if the number of full kanban cards of items of the same specific type at the production pair is lower or equal than the local buffer threshold parameter and if the number of full kanban cards for the items of the same specific type along the downstream process is lower or equal than the global demand threshold parameter;
  d) producing, at each of the production pairs, the item of a type whose priority level is highest according to a given priority model defining a priority sequence of the four priority levels for production requests for different item types.

10. A non-transitory computer-readable medium having stored thereon a data structure to be performed by a processor for controlling a just-in-time (JIT) item production via kanban cards in a discrete manufacturing production system, items being transformed according to a flow shop containing a raw material buffer followed by a sequence of production pairs containing one workstation and an assigned buffer, each of the workstations producing an item to be moved into the assigned buffer, a first workstation producing the item starting from the raw material buffer and each other remaining workstation produces the item starting from the buffer assigned to a previous adjacent workstation, each of the workstations being able to produce more than one type of item according to requests received by means of different sets of different one of the kanban cards associated to different item types, each set of the kanban cards consists of a given number of kanbans, wherein each of the kanban cards can have two statuses including an empty status denoting that item replenishment is requested and a full status denoting that a produced item is ready in the assigned buffer, the instructions which comprises the steps of:
  a) providing a local buffer threshold parameter denoting a desired safety stock of the items of a specific type in the assigned buffer for each of the production pairs, for each specific item type and at given points in time;
  b) providing a global demand threshold parameter denoting a quantity of the items of the specific item type required along a downstream process to satisfy an estimated demand for each of the production pairs, for each of the specific item types and at other given points in time;
  c) at each of the production pairs, whenever the kanban card associated to an item of the specific type switches status, assigning to the kanban card one of four priority levels indicating a priority level of a production request of the associated item type, according to the following logical rules:
    assigning a first priority level to the kanban card if a number of full kanban cards of items of a same specific type at a production pair buffer is greater than the local buffer threshold parameter and if the number of full kanban cards for the items of the same specific type along the downstream process is greater than the global demand threshold parameter;
    assigning a second priority level to the kanban card if the number of full kanban cards of items of the same specific type at the production pair is lower or equal than the local buffer threshold parameter and if the number of full kanban cards for the items of the same specific type in the downstream process is greater than the global demand threshold parameter;
    assigning a third priority level to the kanban card if the number of full kanban cards of items of the same specific type at the production pair is greater than the local buffer threshold parameter and if the number of full kanban cards for the items of the same specific type along the downstream process is lower or equal than the global demand threshold parameter;
    assigning a fourth priority level to the kanban card if the number of full kanban cards of items of the same specific type at the production pair is lower or equal than the local buffer threshold parameter and if the number of full kanban cards for the items of the same specific type along the downstream process is lower or equal than the global demand threshold parameter;

d) producing, at each of the production pairs, the item of a type whose priority level is highest according to a given priority model defining a priority sequence of the four priority levels for production requests for different item types.

\* \* \* \* \*